United States Patent
Sak et al.

(10) Patent No.: US 10,325,602 B2
(45) Date of Patent: Jun. 18, 2019

(54) NEURAL NETWORKS FOR SPEAKER VERIFICATION

(71) Applicant: Google LLC, Mountain View, CA (US)

(72) Inventors: Hasim Sak, New York, NY (US); Ignacio Lopez Moreno, New York, NY (US); Alan Sean Papir, New York, NY (US); Li Wan, Jersey City, NJ (US); Quan Wang, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/666,806

(22) Filed: Aug. 2, 2017

(65) Prior Publication Data

US 2019/0043508 A1 Feb. 7, 2019

(51) Int. Cl.
| | | |
|---|---|---|
| *G10L 17/04* | (2013.01) | |
| *G10L 17/06* | (2013.01) | |
| *G10L 17/18* | (2013.01) | |
| *G10L 17/22* | (2013.01) | |

(52) U.S. Cl.
CPC ............ *G10L 17/22* (2013.01); *G10L 17/04* (2013.01); *G10L 17/06* (2013.01); *G10L 17/18* (2013.01)

(58) Field of Classification Search
CPC .......... G10L 17/04; G10L 17/12; G10L 17/18
See application file for complete search history.

(56) References Cited

U.S. PATENT DOCUMENTS

| | | | | |
|---|---|---|---|---|
| 6,006,184 A | * | 12/1999 | Yamada | G10L 17/12 704/245 |
| 9,824,692 B1 | * | 11/2017 | Khoury | G10L 17/08 |
| 2004/0236573 A1 | * | 11/2004 | Sapeluk | G10L 17/02 704/224 |
| 2015/0127336 A1 | | 5/2015 | Lei et al. | |
| 2017/0069327 A1 | | 3/2017 | Heigold et al. | |
| 2018/0061397 A1 | * | 3/2018 | Huang | G06N 3/0445 |

(Continued)

OTHER PUBLICATIONS

Vivaracho, Carlos E., et al. "Extracting the most discriminant subset from a pool of candidates to optimize discriminant classifier training." International Symposium on Methodologies for Intelligent Systems. Springer, Berlin, Heidelberg, 2003. (Year: 2003).*

(Continued)

*Primary Examiner* — Brian L Albertalli
(74) *Attorney, Agent, or Firm* — Fish & Richardson P.C.

(57) ABSTRACT

Systems, methods, devices, and other techniques for training and using a speaker verification neural network. A computing device may receive data that characterizes a first utterance. The computing device provides the data that characterizes the utterance to a speaker verification neural network. Subsequently, the computing device obtains, from the speaker verification neural network, a speaker representation that indicates speaking characteristics of a speaker of the first utterance. The computing device determines whether the first utterance is classified as an utterance of a registered user of the computing device. In response to determining that the first utterance is classified as an utterance of the registered user of the computing device, the device may perform an action for the registered user of the computing device.

20 Claims, 7 Drawing Sheets

(56) References Cited

U.S. PATENT DOCUMENTS

2018/0158463 A1* 6/2018 Ge .................... G10L 17/04

OTHER PUBLICATIONS

Heigold, Georg, et al. "End-to-end text-dependent speaker verification." Acoustics, Speech and Signal Processing (ICASSP), 2016 IEEE International Conference on. IEEE, 2016. (Year: 2016).*
Zhang, Shi-Xiong, et al. "End-to-end attention based text-dependent speaker verification." Spoken Language Technology Workshop (SLT), 2016 IEEE. IEEE, 2016. (Year: 2016).*
Ge, Zhenhao, et al. "Neural network based speaker classification and verification systems with enhanced features." Intelligent Systems Conference (IntelliSys), 2017. IEEE, 2017. (Year: 2017).*
'en.wikipedia.org' [online] "Backpropagation," Last Updated on: Jun. 9, 2017, [retrieved on Jun. 16, 2017] Retrieved from Internet URL< https://en.wikipedia.org/wiki/Backpropagation> 14 pages.
'en.wikipedia.org' [online] "k-means clustering," Last Updated on: May 30, 2017, [retrieved on Jun. 16, 2017] Retrieved from Internet URL< https://en.wikipedia.org/wiki/K-means_clustering> 8 pages.
'www.mathworks.com' [online] "Neural Network Training Concepts," 2017, [retrieved on Jun. 16, 2017] Retrieved from Internet URL< https://www.mathworks.com/help/nnet/ug/neural-network-training-concepts.html?requestedDomain=www.mathworks.com &requestedDomain=www.mathworks.com> 6 pages.
Ge et al. "Neural Network Based Speaker Classification and Verification Systems with Enhances Features," arXiv preprint arXiv 1702.02289v1, Feb. 8, 2017, 6 pages.
Islam et al. "A Novel Approach for Text-Independent Speaker Identification Using Artificial Neural Network," International Journal of Innovative Research in Computer and Communication Engineering 1(4), Jun. 2013, 7 pages.
Litinskii et al. "Neural Network Clustering Based on Distances Between Objects," Artificial Neural Networks—ICANN 2006, 2006, 7 pages.
Love et al. "Automatic Speaker Recognition Using Neural Networks," Submitted to Dr. Joydeep Ghosh for EE371D Intro. To Neural Networks, Electrical and Computer Engineering Department, University of Texas, Austin, Spring 2004, 25 pages.
Lukic et al. "Speaker Identification and Clustering Using Convolutional Neural Networks," IEEE International Workshop on Machine Learning for Signal Processing, Sep. 13-16, 2016, 6 pages.
Nair et al. "Efficient Speaker Identification Using Artificial Neural Network," IJECT 6(1) Jan.-Mar. 2015, ISSN 2230-7109 (online), 4 pages.
Nossair et al. "A Neural Network Clustering Technique for Text-Independent Speaker Identification," Proceedings of ANNIE Conference, Nov. 13-16, 1994, 9 pages.
Richardson et al. "Deep Neural Network Approaches to Speaker and Language Recognition," IEEE Signal Processing Letters, 22(10) Oct. 2015, 5 pages.
Variani et al. "Deep Neural Networks for Small Footprint Text-Dependent Speaker Verification," IEEE International Conference on Acoustic, Speech and Signal Processing, May 4-9, 2014, 5 pages.
Sainath. "Towards End-to-End Speech Recognition Using Deep Neural Networks," PowerPoint presentation, Deep Learning Workshop, ICML, Jul. 10, 2015, 51 pages.
PCT International Search Report and Written Opinion issued in International Application No. PCT/US2018/032681, dated Jul. 26, 2018, 17 pages.
Wan et al. "Generalized End-to-End Loss for Speaker Verification," arXiv 1710.10467v1, Oct. 28, 2017, 5 pages.

* cited by examiner

FIG. 4B

Speaker Representation Distances Table

FIG. 4A

Training Batch: Group 1 (402a), Group 2 (402b), ..., Group m (402m), each containing Speaker k, Utterance 1 through Utterance n (404).

NEURAL NETWORKS FOR SPEAKER VERIFICATION

BACKGROUND

Neural networks are machine learning models that can be trained to predict an output for a received input. Some neural networks include one or more hidden layers of nonlinear units (e.g., nodes) in addition to an output layer. The output of each hidden layer can be used as input to the next layer in the network, e.g., the next hidden layer or the output layer. Each layer of the network generates an output from a received input in accordance with current values of internal parameters of that layer, such as values that represent weights assigned to the nonlinear units in the layer.

Neural networks have been trained to perform various data processing tasks, such as classification, prediction, and translation. Some systems include multiple data processing components, e.g., in successive stages, to carry out a given task.

Recently, computing devices that provide multiple user input modalities have become more prevalent. For example, smartphones and other user devices include speech recognition services that allow users to provide voice inputs to a device as an alternative to typing or pointing inputs. Voice-based inputs may be more convenient in some circumstances as a hands-free means for interacting with the computing device. Some devices require that a user's identity be verified before performing an action based upon voice input, in order to guard against breaches of privacy and security.

SUMMARY

This specification generally describes systems, methods, devices, and other techniques for training and using a speaker verification neural network. A speaker verification neural network may be trained, for example, to process a neural network input that characterizes an utterance of a user, and to generate from the input a speaker representation that indicates speaking characteristics of the user who spoke the utterance. After training, the speaker verification neural network may be employed to perform speaker verification tasks to verify the identity of a speaker based on an utterance of the speaker. For example, a speaker may register with a computing device by providing enrollment utterances, which are processed with the speaker verification neural network to create a signature of the speaker's voice. Later, the speaker may provide a new utterance. The speaker verification neural network may process the new utterance to generate a speaker representation based upon the new utterance. The speaker representation can then be compared to the previously generated speaker signature to determine if the speaker of the new utterance is the registered speaker.

This specification further describes techniques for training a speaker verification neural network that can both improve the efficiency of training the neural network and result in a trained neural network that better models speaking characteristics of a user so as to differentiate the user's voice from other users who may have similar speaking characteristics. For example, the speaker verification neural network may be trained on a batch of training samples that represent training utterances from multiple speakers. The training system may employ a loss function that encourages the neural network to minimize variation among training utterances from the same speaker, while maximizing the distance between the speaker representation for each training utterance and a speaker representation of a closest, non-matching speaker.

Some implementations of the subject matter disclosed herein include a computer-implemented method. The method includes receiving, by a computing device, data that characterizes a first utterance. The computing device provides the data that characterizes the utterance to a speaker verification neural network. Subsequently, the computing device obtains, from the speaker verification neural network, a speaker representation that indicates speaking characteristics of a speaker of the first utterance. The computing device determines whether the first utterance is classified as an utterance of a registered user of the computing device. In response to determining that the first utterance is classified as an utterance of the registered user of the computing device, the device may perform an action for the registered user of the computing device. The speaker verification neural network may be trained on batches of training utterances using a respective training loss for each batch that is based on, for each of multiple training speakers represented in the batch: (i) differences among speaker representations generated by the speaker verification neural network from training utterances of the training speaker within the batch, and (ii) for each first speaker representation generated from a training utterance of the training speaker within the batch, a similarity between the first speaker representation and a second speaker representation for a different training speaker represented in the batch.

These and other implementations can optionally include one or more of the following features.

Determining whether the first utterance is classified as an utterance of the registered user of the computing device can include comparing the speaker representation for the first utterance to a speaker signature for the registered user, wherein the speaker signature is based on speaker representations derived from one or more enrollment utterances of the registered user.

The registered user can be a first registered user. The method can further include (i) comparing the speaker representation for the first utterance to respective speaker signatures for multiple registered users of the computing device including the first registered user to determine a respective distance between the speaker representation for the first utterance and the respective speaker signatures for the multiple registered users, and (ii) determining that the first utterance is classified as an utterance of the first registered user of the computing device based on the respective distance between the speaker representation for the first utterance and the respective speaker signature for the first registered user being less than a threshold distance from each other.

The speaker verification neural network may be stored locally on the computing device. Obtaining the speaker representation can include executing the speaker verification neural network on the computing device.

For each first speaker representation generated from a training utterance of the training speaker within the batch, the different training speaker can be selected from among multiple different training speakers represented in the batch based on a distance between the first speaker representation generated from the training utterance of the training speaker and the second speaker representation for the different training speaker. The second speaker representation is an averaged speaker representation generated from multiple training utterances of the different training speaker. The selected different training speaker may be selected based on the distance between the first speaker representation generated from the training utterance of the training speaker and the second speaker representation for the different training speaker being shorter than the distance between the first speaker representation and speaker representations for any other of the different training speakers.

For each training speaker of multiple training speakers represented in a batch, the differences among speaker representations generated by the speaker verification neural network from training utterances of the training speaker within the batch can be determined based on distances of the speaker representations of the training speaker to an averaged speaker representation generated from two or more training utterances of the training speaker.

The speaker verification neural network can be a long short-term memory (LSTM) neural network.

The data that characterizes the first utterance can be feature data that characterizes acoustic features of the first utterance. The computing device can further generate the feature data for the first utterance from audio data for the first utterance that characterizes an audio waveform of the first utterance.

Performing the action that is assigned to the registered user of the computing device can include transitioning the computing device from a locked state to an unlocked state.

Performing the action that is assigned to the registered user of the computing device can include accessing user data from a user account of the registered user of the computing device.

Some implementations of the subject matter disclosed herein include one or more computer-readable media (e.g., non-transitory media) having instructions stored thereon that, when executed by one or more processors, cause the processors to perform operations for any of the methods disclosed herein. In some implementations, a computing device includes the one or more processors and the one or more computer-readable media.

Some implementations of the subject matter disclosed herein include a computer-implemented method for training a speaker verification neural network. The method can include obtaining, by a computing system, a training batch that includes multiple groups of training samples, wherein: (i) each training sample in the training batch characterizes a respective training utterance for the training sample, and (ii) the multiple groups of training samples each corresponds to a different speaker such that each group consists of training samples that characterize training utterances of a same speaker that is different from the speakers of training utterances characterized by training samples in other ones of the multiple groups of training samples; for each training sample in the training batch, processing the training sample with the speaker verification neural network in accordance with current values of internal parameters of the speaker verification neural network to generate a speaker representation for the training sample that indicates speaker characteristics of a speaker of the respective training utterance characterized by the training sample; for each group of training samples, averaging the speaker representations for training samples in the group to generate an averaged speaker representation for the group; for each training sample in the training batch, determining a loss component for the speaker representation for the training sample based on: (i) a distance between the speaker representation for the training sample and the averaged speaker representation for the group to which the training sample belongs, and (ii) a distance between the speaker representation for the training sample and a closest averaged speaker representation among the averaged speaker representations for the groups to which the training sample does not belong; and updating the current values of the internal parameters of the speaker verification neural network using the loss components for the speaker representations for at least some of the training samples in the training batch.

These and other implementations can optionally include one or more of the following features. The computing system may iteratively update the current values of the internal parameters of the speaker verification neural network over multiple training iterations. The computing system may train the speaker verification neural network on different training batches in each of at least some of the plurality of training iterations.

The training batch can be generated by determining criteria for the training batch, the criteria specifying (i) a total number of speakers to be represented in the training batch and (ii) a total number of training samples per speaker to include in the training batch. The system may select training samples for inclusion in the training batch according to the criteria.

The criteria can include a specified length for training utterances characterized by training samples in the training batch. The system can extract segments of the specified length from random locations of the training utterances. Each training sample in the training batch can characterize the segment of the respective training utterance for the training sample to an exclusion of a portion of the respective training utterance located outside of the segment that was extracted from the respective training utterance.

The training batch can be a first training batch that is used to train the speaker verification neural network in a first training iteration. The method can further include determining second criteria for a second training batch that is for training the speaker verification neural network in a second training iteration, the second criteria specifying a second length for training utterances characterized by training samples in the second training batch, the second length being different from the length specified by the criteria for the first training batch; and selecting training samples for inclusion in the second training batch according to the second criteria, wherein at least one training sample selected for inclusion in the second training batch characterizes a different segment of a same training utterance that is characterized by a training sample in the first training batch.

For each training sample in the training batch, the system can determine a respective distance between the speaker representation for the training sample and a respective averaged speaker representation for each group to which the training sample does not belong. The system selects the closest averaged speaker representation as the respective from the respective averaged speaker representations for the groups to which the training sample does not belong based on the respective distance between the speaker representation for the training sample and the closest averaged speaker representation being less than the respective distances between the speaker representation and the respective averaged speaker representation for each other group to which the training sample does not belong.

Determining the loss component for the speaker representation for each training sample in the training batch can include determining the loss component according to a loss function that does not account for the respective distances between the speaker representation and the respective averaged speaker representation for each group to which the training sample does not belong other than the group that corresponds to the closest averaged speaker representation.

Updating the current values of the internal parameters of the speaker verification neural network comprises back-propagating a batch loss that is based on the loss components for the speaker representations for the at least some of the training samples using stochastic gradient descent.

The speaker verification neural network is a long short-term memory (LSTM) neural network.

Some implementations of the subject matter disclosed herein may, in certain instances, achieve one or more of the following advantages. First, the efficiency of training the neural network may be improved. For example, rather than updating the current values of internal parameters of the neural network after processing each pair of training utterances, many training utterances from multiple speakers (e.g., three or more speakers) may be processed in a batch so that the neural network may be updated only once for the entire batch. Moreover, the computational expense of updating the neural network based on utterances from different (e.g., non-matching) speakers may be reduced by selectively focusing on speaker representations for utterances of different speakers who are determined to have the most similar voices (e.g., speaker characteristics). Moreover, by training the neural network to reduce variation among speaker representations for training utterances of the same speaker, while maximizing the distance among speaker representations for training utterances of closest different speakers, the trained neural network may be better trained to produce speaker representations that yield more accurate speaker verification results. For instance, the trained neural network may produce more consistent speaker representations from different verification utterances of the same speaker, and may generate more distinctive speaker representations for verification utterances of different speakers—even if the different speakers have similar voices (e.g., for speakers in the same family, having similar ages and backgrounds). As a result, the speaker verification neural network in use may have a lower rate of false positives of accepting a non-registered (e.g., non-authorized) user's voice identity claim, and may also have a lower rate of false negatives of not accepting a registered (e.g., an authorized) user's voice identity claim.

Additional features and advantages will be recognized by those of ordinary skill in the art in view of the entire specification, including this description, the drawings, and the claims.

DESCRIPTION OF DRAWINGS

FIG. 4A illustrates an example batch of training samples which may be processed during a single training cycle for a speaker verification neural network.

FIG. 4B shows a table of distances among speaker representations that a training system may calculate during a training cycle for a particular batch of training samples.

DETAILED DESCRIPTION

Figure 1:
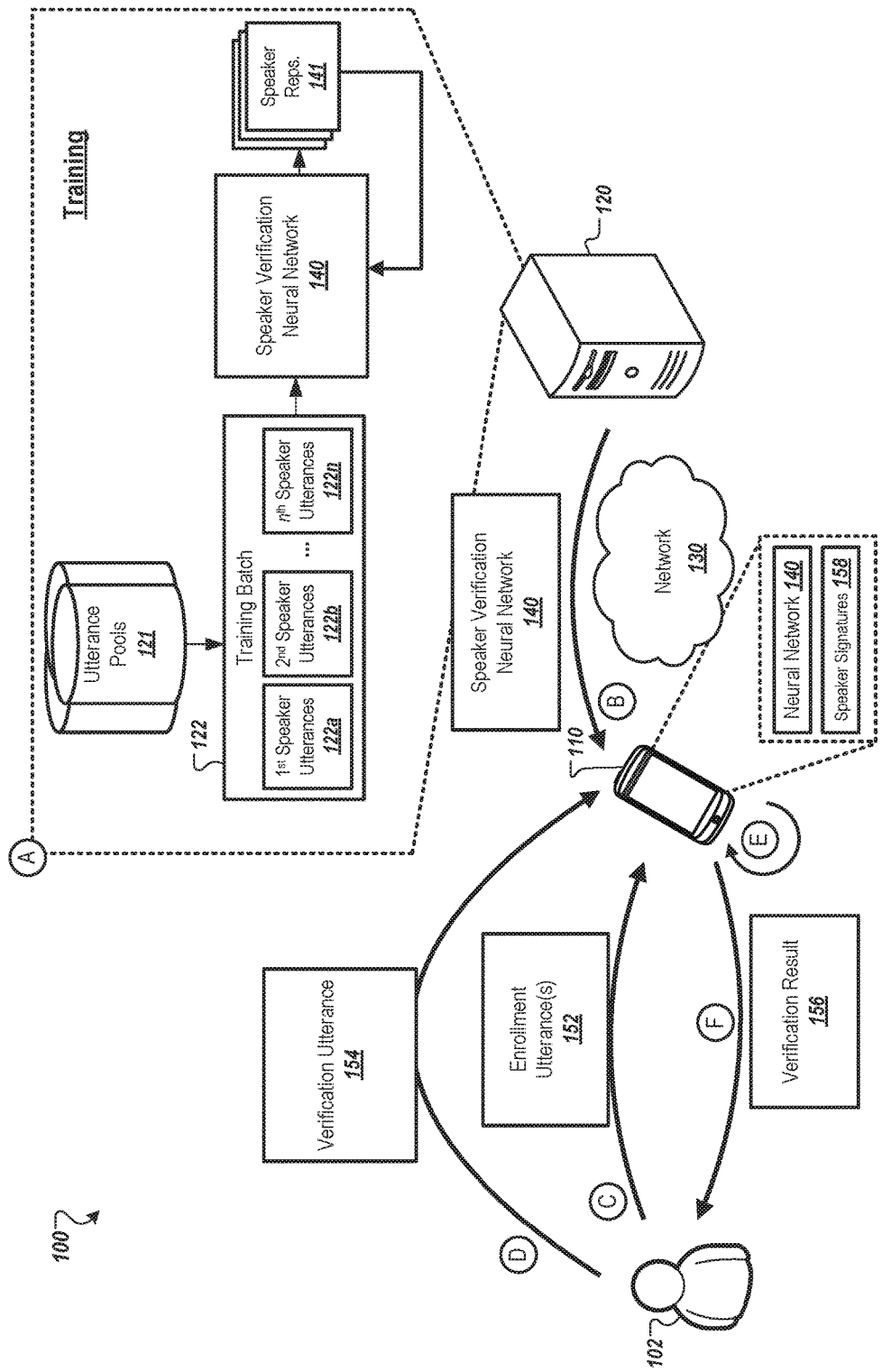
FIG. 1 is a schematic diagram of an example system for training a speaker verification neural network, and for performing a speaker verification process using the neural network.

FIG. 1 is a schematic diagram of an example system 100 for training a speaker verification neural network 140, and for performing a speaker verification process using the neural network 140. Speaker verification generally refers to the task of verifying an identity of a speaker of an utterance. In some instances, speaker verification involves accepting or rejecting the identity claim of a speaker based on characteristics of the speaker's voice, as determined from one or more utterances of the speaker. In some instances, speaker verification involves determining whether an utterance was spoken by a registered user of a computing device, and optionally identifying which of multiple registered users was the speaker of the utterance. As depicted in FIG. 1, speaker verification can involve several phases, including (i) training of the speaker verification neural network 140, (ii) enrollment (e.g., registration) of a new speaker, and (iii) verification of a received utterance.

The system 100 includes a client device 110, a computing system 120, and a communication network 130. In some implementations, the speaker verification neural network 140 is trained by the computing system 120 and is subsequently provided to the computing device 110, e.g., over the network 130. In some implementations, the speaker verification neural network 140 is pre-loaded on the client device 110, e.g., as a component of an operating system or a native application of the client device 110. The client device 110 is configured to use the speaker verification neural network 140 to enroll a user 102 of the client device 110, thereby allowing the user 102 to provide utterances to authenticate himself with the device 110. To verify the identity of the user 102 after enrollment, the client device 110 processes data characterizing an utterance of the user 102 with the speaker verification neural network 140.

Although FIG. 1 illustrates a process for speaker verification that is performed locally on the client device 110, in other implementations speaker verification may be performed remotely at the computing system 120 or at a different computing system. In such implementations, the client device 110 may provide data characterizing an utterance to the computing system 120 over communication network 130 (e.g., the Internet or a local area network). The computing system 120 processes data characterizing the utterance with speaker verification neural network 140 and then provides a response to the client device 110 indicating a result of the remote speaker verification process.

In general, the client device 110 is a user computing device configured to detect utterances and to invoke a local or remote speaker verification process. In some examples, the client device 110 is a desktop computer, a notebook computer, a tablet computing device, a smart watch or other wearable computing device, a smartphone, a music player, an e-book reader, a home-assistant device (e.g., with our without a display), a casting device, a television, a remote control, or a voice-enabled navigation system. Some client devices 110 may be classified as a mobile computing device, e.g., a smartphone, a smartwatch, or a tablet computing device.

The remote computing system 120 can include one or more computers in one or more locations. In some implementations, the system 120 implements parallel or distributed processing techniques across multiple computers to train the neural network 140 and/or execute other tasks.

The speaker verification neural network 140 is a machine-learning model that is configured to process data characterizing an utterance and to generate a speaker representation indicating speaking characteristics of a speaker of the utterance. The neural network 140 may include one or more layers of nonlinear units to generate a speaker representation for a received input. In some implementations, the input to the neural network represents feature data that indicates acoustic features (e.g., filterbank energies or mel-frequency cepstral coefficients (MFCCs)) of an utterance. In some examples, the acoustic features are derived from an initial digital representation of the utterance that encodes audio data that can be played to audibly reproduce the utterance. In some implementations, the speaker verification neural network 140 lacks a softmax or other classification layer. Instead, the speaker representation that is output by the speaker verification neural network 140 can be an embedding that represents a hidden state of the last hidden layer of the network 140 which results from processing the input data for an utterance through each of the layers of the network 140.

In some implementations, the speaker verification neural network 140 is a Long Short-Term Memory (LSTM) neural network that includes one or more LSTM memory blocks. Each LSTM memory block can include one or more memory cells, and each memory cell can include an input gate, a forget gate, and an output gate that allow the cell to store previous states for the cell, e.g., for use in generating a current activation or to provide to other components of the neural network 140. In other implementations, the speaker verification neural network is a feedforward neural network. The speaker verification neural network can also be a convolutional neural network, a recurrent neural network, or may be a deep neural network having several portions of different types.

As illustrated in FIG. 1, the system 100 is configured to perform operations for training and using the speaker verification neural network 140. These operations are represented, by way of example, as occurring at various stages (A)-(F) in FIG. 1

At stage (A), the computing system 120 performs a process to train the speaker verification neural network 140. Before the network 140 can be deployed to customer devices, the system 120 first trains the network 140 to generate speaker representations that characterize the unique speaking characteristics of different speakers. The speaker verification neural network 140 may learn how to generate speaker representations by iteratively updating current values of internal parameters of the neural network 140 over a series of training cycles. In each training cycle, the neural network 140 processes a batch of training utterances 122. The batch of training utterances 122 may include multiple groups of training utterances 122a-n, where the utterances in each group were all spoken by the same speaker, but the utterances from different groups were all spoken by different speakers. The output of the speaker verification neural network in each cycle is a set of speaker representations 141 that has been generated for each training utterance in the batch 122. The computing system 120 then uses the speaker representations 141 to compute values for a loss function or other objective function, which is then back-propagated through the network 140 to adjust the current values of the internal parameters of the network 140 and optimize a loss function. The loss function is generally formulated to minimize variation among speaker representations for training utterances of the same speaker, while maximizing differences among speaker representations for training utterances of different speakers. In some implementations, the loss function is not configured to maximize the difference among speaker representations for training utterances of all the speakers represented in a batch, but instead maximizes the distance of only the speaker representations for training utterances of pairs of different speakers that are determined to be most similar to each other in a batch. The training process is described in further detail with respect to FIGS. 3-6.

At stage (B), the trained speaker verification neural network 140 is provided from the computing system 120 to the client device 110, e.g., by transmitting at least a portion of the neural network 140 over network 130. The client device 110 may include an application for performing speaker verification. The speaker verification neural network 140 may be loaded in the application or may otherwise be made available to the application, e.g., via a speech service of an operating system on the client device 110. The speaker verification application is configured to use the speaker verification neural network 110 to enroll/register users of the client device 110 based on their speaking characteristics and to generate speaker representations for newly received utterances. The speaker representations for the newly received utterances can be compared to speaker signatures 158 for enrolled/registered users of the device 110 to determine whether the utterance was likely spoken by one of the enrolled/registered users of the client device 110, e.g., whether the device 110 classifies the newly received utterances as utterances of a registered speaker.

At stage (C), the client device 110 performs a process of enrolling the user 102 as a registered speaker. For example, the speaker verification application on the device 110 may prompt the user 102 to speak one or more enrollment utterances 152 from which a speaking signature 158 can be generated for the user 102. In some implementations the enrollment utterances 152 are dictations of short phrases of one, two, three, four, or more words. The application may prompt the user 102 to speak pre-defined phrases as the enrollment utterances 152, or the user 102 may spontaneously speak and provide enrollment utterances based on phrases that were not specifically provided to the user 102. If multiple enrollment utterances 152 are used, the same phrase may be spoken in each utterance 152. Alternatively, different phrases may be spoken among all or some of the enrollment utterances 152. Upon receiving the enrollment utterances, the device 110 processes the utterances 152 with the speaker verification neural network 140 to generate a respective speaker representation for each enrollment utterance 152. The device 110 may then create a speaker signature 158 for the user 102 from all or some (or one) of the speaker representations for the enrollment utterances 152. In some implementations, the speaker signature 158 is an average of the respective speaker representations for multiple enrollment utterances 152. In some implementations, the speaker signature 158 is a speaker representation for a particular one of the enrollment utterances 152 that is selected based on one or more criteria, e.g., based on an audio or voice quality of the audio for the selected enrollment utterance 152.

After enrollment, the user 102 may use voice-based inputs to identify himself or herself with the client device 110 during the "verification" phase (broadly represented by stages (D)-(F) in FIG. 1). For example, at stage (D), the user 102 inputs a verification utterance 154 to the client device 110. The client device 110 may capture the user's speech for the verification utterance 154 using a microphone and audio processing circuits that convert the speech into a digital audio representation of the verification utterance 154. In some implementations, the device 110 includes a feature extractor that processes the audio representation of the verification utterance 154 and generates feature data that represents acoustic features of the verification utterance 154. The feature data may be suitably formatted for processing by the speaker verification neural network 140 and, at stage (E), the speaker verification neural network 140 processes the feature data for the verification utterance 154 to generate a speaker representation that indicates speaking characteristics of the speaker of the verification utterance 154.

To verify the identity of the speaker of the verification utterance 154, the client device 110 may compare the speaker representation for the verification utterance 154 with speaker signatures 158 stored on the client device 110 for one or more registered users. The speaker representation for the verification utterance 154 may be compared with a given speaker signature 158 by determining a distance between the speaker representation and the speaker signature 158. As used herein, distance is a measure of a degree of similarity between two items. Thus, the distance between the speaker representation and the speaker signature 158 represents how similar the speaker representation is to the speaker signature 158. A closer distance indicates a higher degree of similarity, whereas a farther distance indicates a lesser degree of similarity. In some implementations, the distance is determined as a cosine distance between the speaker representation and the speaker signature 158.

In some implementations, the client device 110 compares the distance between the speaker representation for the verification utterance 154 and the speaker signature 158 to a threshold distance. If the distance between the speaker representation for the verification utterance 154 and the speaker signature 158 meets the threshold, then client device 110 identifies a match between the speaker of the verification utterance 154 and the registered user to whom the speaker signature 158 is assigned. In the case of a match, the device 110 may accept the identity of the speaker of the verification utterance 154 as the registered user and perform an action for the registered user such as unlocking the device 110, logging the user 102 into an account of the registered user, providing content for presentation to the user 102 that is created or selected based on profile information for the registered user, accessing data or personal accounts of the registered user, or a combination of these and/or other actions. The action may be one that corresponds to or has been assigned to the registered user, e.g., an action that the registered user is authorized or permitted to perform, where the action is not permitted for unrecognized users. The action may be one that, at least for the current state of the device 110, is conditioned on verification of the registered user's identity or is restricted so that only a registered user can initiate the action. In the event that the distance between the speaker representation for the verification utterance 154 and the speaker signature 158 does not meet the threshold distance, the device 110 may reject the identity claim of the user 102 and block one or more requested actions from being performed that are restricted to the registered user. For example, the client device 110 may refuse to transition from a locked state to an unlocked state or may deny a request to access an account of the registered user.

At stage (F), the client device 110 presents an indication of a verification result 156 to the user 102. In some implementations, if the client device 110 has accepted the identity of the user 102, the client device 110 generates a visual or audio cue that indicates the verification has been successful. In some other implementations, if the client device 110 has accepted the identity of the user 102, the client device 110 may prompt the user 102 for a next input. For example, the client device 110 may present a message "Device enabled. Please enter your search" on the display. In some other implementations, if the client device 110 has accepted the identity of the user 102, the client device 110 may perform a subsequent action without waiting for further inputs from the user 102. For example, the user 102 may provide spoken input for the phrase "Hello Phone, search the nearest coffee shop." The client device 110 may verify the identity of the user 102 using the verification phrase "Hello Phone" from the prefix of this phrase. If the identity of the user 102 is accepted, the client device 110 may automatically invoke a search for the nearest coffee shop without asking the user 102 for further inputs. Generally, in some implementations, if the client device 110 has accepted the identity of the user 102, the client device 110 may respond by transitioning from a locked state, in which one or more capabilities of the client device 110 are disabled or blocked, to an unlocked state, in which the capabilities are enabled or otherwise made available to the user 102 to access. Similarly, the client device 110 may "wake" or transition from a low-power state to a more fully-featured state if a user's identity has been accepted in the verification phase. In some implementations, if the client device 110 has rejected the identity of the user 102, the client device 110 may present a visual or audio indication of the rejection to the user 102.

In some implementations, the client device 110 may apply different distance thresholds in different contexts depending on the strength of the identity claim required to perform a requested action. For example, a voice request to access a personal media playlist of a registered user is likely less sensitive than a voice request to access an email or financial account of a registered user. As such, the device 110 may apply a higher distance threshold (i.e., require a lesser disagree of similarity) for accessing the personal media playlist of the registered user, so as to reduce occurrences of false negatives in accepting the identity of a user (the risk of false positives is relatively low in this context). Conversely, the device 110 may apply a lower distance threshold (i.e., require a greater degree of similarity) for accessing the email or financial account of the registered user, so as to reduce occurrences of false positives in accepting the identity of a user based on voice input (since the risk of false positives is greater than the risk of false negatives in this more sensitive context).

In some implementations, stages (C)-(F) of the operations represented in FIG. 1 are carried out by a speaker verification application installed on the client device 110. Alternatively, client device 110 may interact with a remote speaker verification service.

Figure 2:
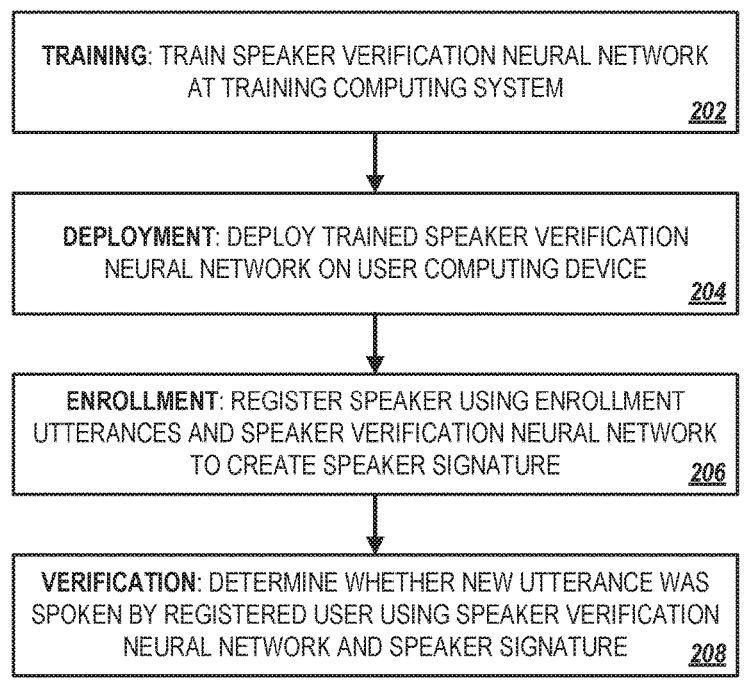
FIG. 2 is a flowchart of an example process for training and using a speaker verification neural network.

FIG. 2 depicts a flowchart of an example process 200 for training and using a speaker verification neural network, e.g., speaker verification neural network 140. Each of the stages 202-208 represents a distinct phase in the creation or use of the neural network. At stage 202, a training computing system, e.g., remote computing system 120, trains the speaker verification neural network. For example, a neural network with a suitable architecture for processing data that characterizes an utterance and generating a speaker representation may be initialized and trained according to the procedures discussed in FIGS. 3-6. At stage 204, the trained speaker verification neural network is deployed for use by one or more client devices. In some implementations, the neural network is loaded directly onto client devices. In other implementations, the neural network is made accessible to client devices through a remote speaker verification service. At stage 206, the speaker verification neural network is used for enrollment to register authorized users of a client device. For example, a user may provide one or more enrollment utterances. The speaker verification neural network may process data characterizing the enrollment utterances to generate a respective speaker representation for each enrollment utterances. A speaker signature for the user can then be created from the speaker representations. The speaker signature may be stored, e.g., at the client computer, to identify the user as a registered speaker. After enrollment/registration, at stage 208, the user may provide a new utterance to the client computer. The client computer may process the new utterance and convert it to suitable form as an input to the speaker verification neural network. The speaker verification neural network then processes data characterizing the utterance and generates a speaker representation for the utterance. To verify whether the speaker of the utterance is an authorized (e.g., registered) user of the client computer, a speaker verification application on the client computer compares the speaker representation to the speaker signature for the registered user. If a distance between the speaker representation and the speaker signature is less than a threshold distance (e.g., are sufficiently similar), the application determines that the speaker of the new utterance is the registered user. The user is thus authenticated with the client computer and the client computer may perform a restricted action such as transitioning to a locked state or accessing restricted content associated with the user.

Figure 3:
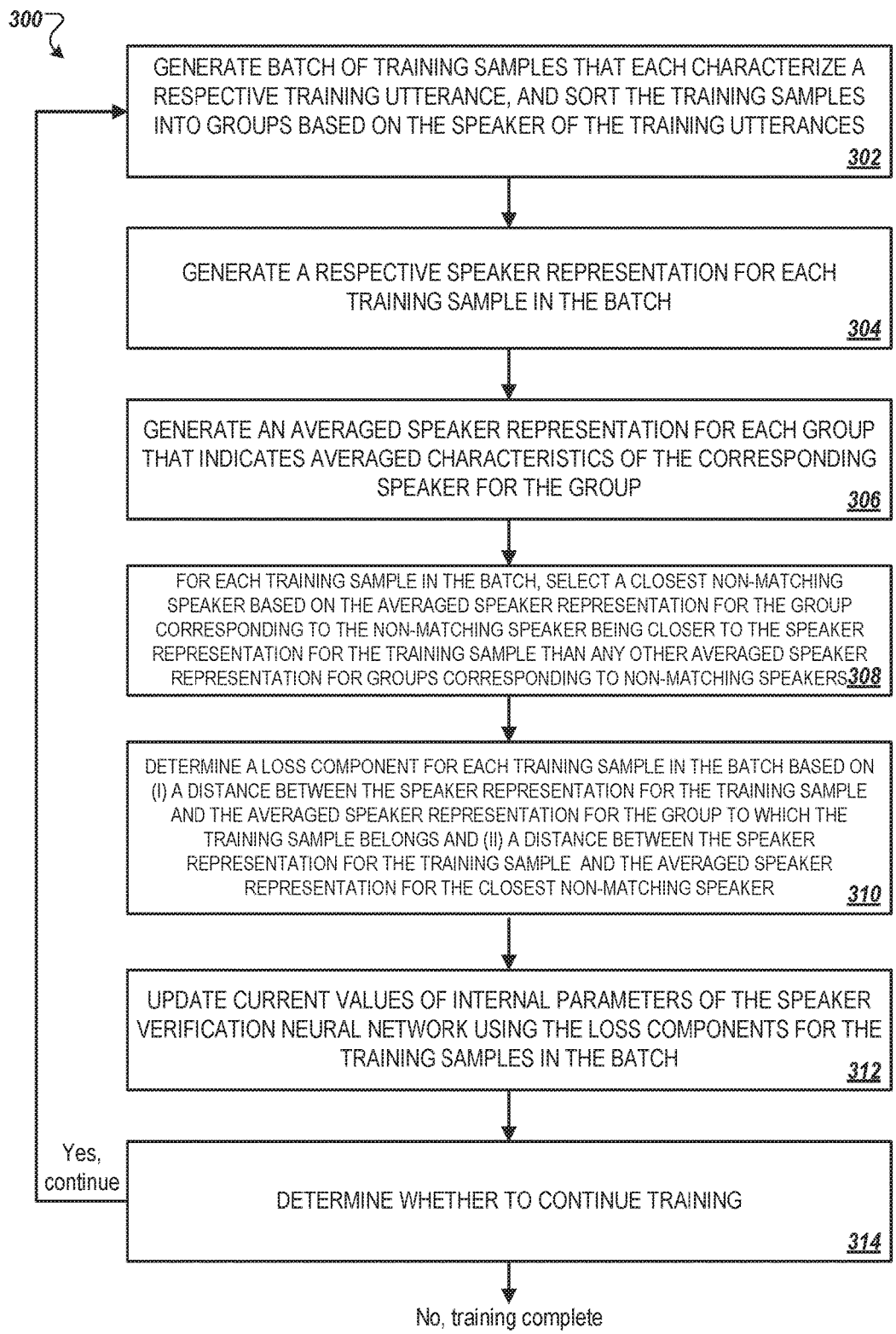
FIG. 3 is a flowchart of an example process for training a speaker verification neural network.

FIG. 3 is a flowchart of an example process 300 for training a speaker verification neural network, e.g., speaker verification neural network 140. The process 300 may be carried out by a training computing system having one or more computers in one or more locations, e.g., computing system 120.

In general, the process 300 involves iteratively training the speaker verification neural network on batches of training samples over a series of training cycles. Stages 302-314 represent operations performed in a single training cycle, but these stages can be repeated for multiple training cycles on different batches of training samples. In each training cycle, the speaker verification neural network processes all the training samples in the current batch in accordance with current values of the internal parameters (e.g., weights) of the neural network. The training system then applies a loss function based on the results of processing the training samples in the batch, and back-propagates an error indicated by the loss function to update the current values of the internal parameters of the neural network. In the next training cycle, a new batch of training samples is processed in accordance with the updated, current values of the internal parameters of the network. In this manner, the neural network incrementally learns how to generate speaker representations for a speaker verification task by iterative training over batches of training samples. In some implementations, before the first training cycle, the internal parameters of the neural network are initialized with random values.

At stage 302, the training system generates a batch of training samples for a current training cycle. Each training sample in the batch includes data characterizing a particular utterance. For example, the data characterizing the utterance may be feature data characterizing acoustic features (e.g., filterbank energies or mel-frequency cepstral coefficients) of an utterance that were extracted from a recorded audio sample of the utterance. Moreover, the training samples may be labeled to indicate an identity of a speaker of the utterance characterized by the training sample. The label may be anonymized so as not to reveal a true identity of the speaker. It is generally sufficient that the label distinguish the speaker from other speakers who are represented in the batch, i.e., other speakers of utterances characterizes training samples in the batch, even if the label does not identify the true identity of the speaker.

Each batch of training samples used in training the speaker verification neural network can include training samples that characterize utterances of multiple different speakers (e.g., 3, 4, 5, 6, 7, 8, or more speakers). Moreover, the batch can include multiple training samples per speaker. The training samples in a batch may be grouped by speaker such that, e.g., a first group of training samples in the batch includes only training samples characterizing utterances of a first speaker, a second group of training samples in the batch includes only training samples characterizing utterances of a second speaker, and so on. The number of training speakers represented in a batch and the number of training samples per speaker may be selected according to a training policy that specifies various training criteria, which are described in further detail with respect to FIG. 6. Moreover, the training criteria may vary for different training cycles so that different numbers of speakers and different numbers of training samples per speaker are changed for different batches.

In some implementations, the utterances characterized by training samples in a batch may be different from each other. That is, the utterances need not correspond to the same word or phrase spoken by each of the users. For example, a first utterance of a first user may correspond to the spoken phrase "How far away is home?", a second utterance of the first user may correspond to the spoken phrase "What time is it?", and a first utterance of a second user may correspond to the spoken phrase "Remind me to pick up groceries after work." For example, training utterances may be randomly sampled from a collection of stored recordings of utterances spoken by different users. The utterances may be anonymized so that they cannot be traced back to individual users, and the users may have indicated their consent to having certain voice inputs stored and used for purposes such as training machine-learning models. By training the neural network on training samples characterizing utterances corresponding to a wide range of words or phrases, the network may be more robustly trained for text-independent speaker verification in which the network can determine speaker representations characterizing speaking characteristics of a user independent of the underlying content of a verification utterance, even previously unseen utterances (e.g., verification utterances corresponding to a phrase that was not spoken in any of the training utterances). In some implementations, the system may be configured to train the speaker verification neural network for text-dependent (e.g., hotword-based) speaker verification, text-independent speaker verification, or both.

At stage 304, the training system provides each of the training samples in the current batch as input to the speaker verification neural network. Each training sample may be processed by the speaker verification neural network independently/separately from the other training samples to generate a respective speaker representation for the training sample that indicates speaking characteristics of the speaker of the utterance characterized by the training sample (sometimes referred to herein as "primary speaker representations" to distinguish from "averaged speaker representations"). The speaker verification neural network processes each training sample in accordance with current values of the internal parameters of the network, which are generally the most updated values through the most recent training cycle. Because the training samples are processed in a batch within a given training cycle, the current values of the internal parameters of the neural network may be unchanged for each training sample processed within the same batch.

At stage 306, the training system generates a respective averaged speaker representation for each group of training samples in the batch. In some implementations, the averaged speaker representation is generated using the same process that a speaker verification application would generate a speaker signature for a particular speaker during the enrollment phase based on speaker representations for multiple utterances of that particular speaker. For example, the training system may identify the primary speaker representations for all the training samples within a group and combine these primary speaker representations according to a specified averaging method to generate the averaged speaker representation for that group. In some implementations, less than all of the primary speaker representations may be combined according to the specified averaging method to generate the averaged speaker representation for that group (e.g., outliers may be excluded). The averaged speaker representation can thus represent a speaker signature for the speaker of the utterances characterized by the training samples in the corresponding group within the batch. The averaging method may be any suitable method for combining speaker representations, such as a strict averaging of the speaker representations, a weighted averaging of the speaker representations, or other techniques.

At stage 308, the training system selects, for each primary speaker representation in the batch (i.e., speaker representations generated from individual training samples, rather than the averaged speaker representations for groups of training samples), a closest non-matching averaged speaker representation. The closest non-matching averaged speaker representation to a given primary speaker representation is the averaged speaker representation for a different group than the group to which the given primary speaker representation belongs and that is closest (e.g., most similar) to the given primary speaker representation. Since each group in a batch corresponds to a different speaker, the selection of a closest non-matching averaged speaker representation serves to identify a closest non-matching speaker to the speaker of a given training utterance. As will be discussed with respect to stages 310 and 312, the training system can use the closest non-matching averaged speaker representation to determine a training loss for adjusting the current values of the speaker verification neural network in order to cause greater separation between speaker representations from different speakers, an in particular, to cause greater separation between speaker representations for speakers that are most similar to each other.

In some implementations, for a given speaker representation, the training system selects the closest non-matching averaged speaker representation by calculating respective distances between the given primary speaker representation and each of the non-matching averaged speaker representations in the batch, i.e., each averaged speaker representation in the batch for a different group/speaker than the group/speaker of the given primary speaker representation. The non-matching averaged speaker representation that has the shortest distance to the given primary speaker representation is then selected as the closest non-matching averaged speaker representation for the given primary speaker representation. As used herein, distance represents a degree of similarity between two items. A shorter distance between items indicates a higher degree of similarity between the items, while a longer distance between items indicates a lower degree of similarity between the items. Thus, the closest non-matching averaged speaker representation for a given primary speaker representation is generally the averaged speaker representation for a different group/speaker that has the shortest distance (e.g., is most similar) to the given primary speaker representation. In some implementations, the distances are determined as cosine distances between primary speaker representations and non-matching averaged speaker representations.

At stage 310, the training system determines a respective loss component for each training sample in the current batch. The loss components for the training samples can subsequently be used to adjust current values of the internal parameters of the speaker verification neural network. In some implementations, the loss component for a given training sample is determined based on two factors. The first factor is a distance between the primary speaker representation for the given training sample and the averaged speaker representation for the group to which the given training sample belongs (i.e., the matching averaged speaker representation). The loss component can represent an error between the primary speaker representation actually generated for a given training sample and a target speaker representation that the training system encourages the speaker verification neural network to generate for the training sample. The target speaker representation is not explicitly defined in the training process 300, but conceptually the target speaker representation is a speaker representation that matches (e.g., is identical or substantially similar to) the averaged speaker representation for a same speaker and that has the greatest distance to the averaged speaker representation for a closest non-matching speaker. As such, a magnitude of the loss component for a given training sample increases as the distance between the primary speaker representation for the given training sample and the matching averaged speaker representation increases. Conversely, the magnitude of the loss component for a given training sample may decrease as the distance between the primary speaker representation for the given training sample and the matching averaged speaker representation decreases.

The second factor of the loss component for a given training sample is the distance between the primary speaker representation for the given training sample and the closest non-matching averaged speaker representation for the given training sample that was selected at stage 308. In contrast to the first factor, the magnitude of the loss component for a given training sample may be inversely proportional to the distance between the primary speaker representation for the given training sample and the closest non-matching averaged speaker representation. That is, as the distance between the primary speaker representation for the given training sample and the closest non-matching averaged speaker representation increases, the magnitude of the loss component tends to decrease to indicate that the primary speaker representation for the given training sample is closer to an ideal/target speaker representation (which may only be conceptual and not explicitly defined). Conversely, as the distance between the primary speaker representation for the given training sample and the closet non-matching averaged speaker representation decreases, the magnitude of the loss component may increase to indicate that the primary speaker representation for the given training sample is further from the ideal/target speaker representation. The individual losses from the first and second factors may be combined to form the loss component for a given training sample. In some implementations, the loss component excludes additional losses based on distances between the primary speaker representation for a given training sample and other non-matching averaged speaker representations that were not determined to be closest to the speaker representation for the given training sample.

At stage 312, the training system combines the individual loss components for each training sample in the current batch to create a batch loss, and uses the batch loss to adjust current values of the internal parameters of the speaker verification neural network, e.g., so as to minimize the batch loss. In some implementations, the training system uses machine-learning techniques such as stochastic gradient descent with backpropagation to adjust the current values of the internal parameters of the speaker verification neural network. For example, the training system can back-propagate a gradient indicated by the batch loss to optimize the network according to a loss function by adjusting weights of nodes in the hidden layers of the neural network. The loss function may be used to optimize the neural network, for example, by minimizing variation among speaker representations for training samples within groups and maximizing distances among speaker representations and their corresponding closest non-matching averaged speaker representation.

At stage 314, the training system determines whether to continue training the speaker verification neural network. In some implementations, training continues until the system determines that an end-of-training condition has occurred. The end-of-training condition may be, for example, consumption of all or substantially all available training samples, completion of a pre-defined number of training cycles, achievement of a performance objective, or a combination of two or more of these. To determine whether a performance objective has been met, in some implementations the training system validates the network after particular training cycles to assess its performance on a validation set of utterances. The validation set of utterances are samples that characterize utterances of one or more speakers, and consist entirely or partially of utterances that were characterized by a training sample in a training batch. If the performance of the network on the validation set of utterances achieves the desired performance objective, then training may be terminated. If the performance of the network on the validation set of utterances does not achieve the desired performance objective, then training may continue. When the training system determines to continue training, the process 300 may return to stage 302 to begin a new training cycle.

In some implementations, the training process 300 may realize one or more advantages. The process 300 may improve the efficiency of training the neural network. For example, rather than updating the current values of internal parameters of the neural network after processing each pair of training utterances, many training utterances from multiple speakers (e.g., three or more speakers) may be processed in a batch so that the neural network may be updated only once for the entire batch. Moreover, the computational expense of updating the neural network based on utterances from different (e.g., non-matching) speakers may be reduced by selectively focusing on speaker representations for utterances of different speakers who are determined to have the most similar voices (e.g., speaker characteristics). Moreover, by training the neural network to reduce variation among speaker representations for training utterances of the same speaker, while maximizing the distance among speaker representations for training utterances of closest different speakers, the trained neural network may be better trained to produce speaker representations that yield more accurate speaker verification results. For instance, the trained neural network may produce more consistent speaker representations from different verification utterances of the same speaker, and may generate more distinctive speaker representations for verification utterances of different speakers—even if the different speakers have similar voices (e.g., for speakers in the same family, having similar ages and backgrounds). As a result, the speaker verification neural network in use may have a lower rate of false positives of accepting a non-registered (e.g., non-authorized) user's voice identity claim, and may also have a lower rate of false negatives of not accepting a registered (e.g., an authorized) user's voice identity claim.

Turning to FIGS. 4A and 4B, diagrams are shown in relation to aspects for training a speaker verification neural network. First, FIG. 4A illustrates an example batch 400 of training samples 404 which may be processed during a single training cycle for a speaker verification neural network. The training batch 400 includes m groups 402 of training samples. Each group 402 includes n training samples 404, such that the batch 400 includes a total of m×n training samples 404. Furthermore, each group 402 corresponds to a particular speaker, i.e., all of the training samples 404 within a particular group 402 characterize utterances of a same speaker. In some implementations, each group 402a-m corresponds to a different speaker from each other. For example, a first group 402a includes n utterances of a first speaker, a second group 402b includes n utterances of a second speaker, and so on. Although FIG. 4A shows a fixed number of training samples 404 per group 402, in other implementations the number of training samples may vary for different ones of the groups 402a-n.

FIG. 4B shows a table 450 for distances among speaker representations that a training system may calculate during a training cycle for a particular batch of training samples. Each row in the table 450 represents a different primary speaker representation $e_{i,j}$, where i is the unique group (speaker) index for the speaker representation, and j is the index of the training sample within the group. Each column in the table 450 represents an averaged speaker representation for a different speaker group. For example, $e_1(avg)$ indicates the averaged speaker representation for a first speaker based on primary speaker representations $e_{1,1}$, $e_{1,2}$, and $e_{1,3}$. Likewise, $e_2(avg)$ indicates the averaged speaker representation for a second speaker based on primary speaker representations $e_{2,1}$, $e_{2,2}$, and $e_{2,3}$, and $e_3(avg)$ indicates the averaged speaker representation for a third speaker based on primary speaker representations $e_{3,1}$, $e_{3,2}$, and $e_{3,3}$. Each cell in the table 450 at the intersection of a primary speaker representation and an averaged speaker representation indicates a distance that may be calculated during a training cycle. For example, a loss component may be determined for each primary speaker representation based on its distance to matching averaged-speaker representation (represented by hashed cells in table 450), and further based on the closer of the two non-matching averaged-speaker representations.

Figure 5:
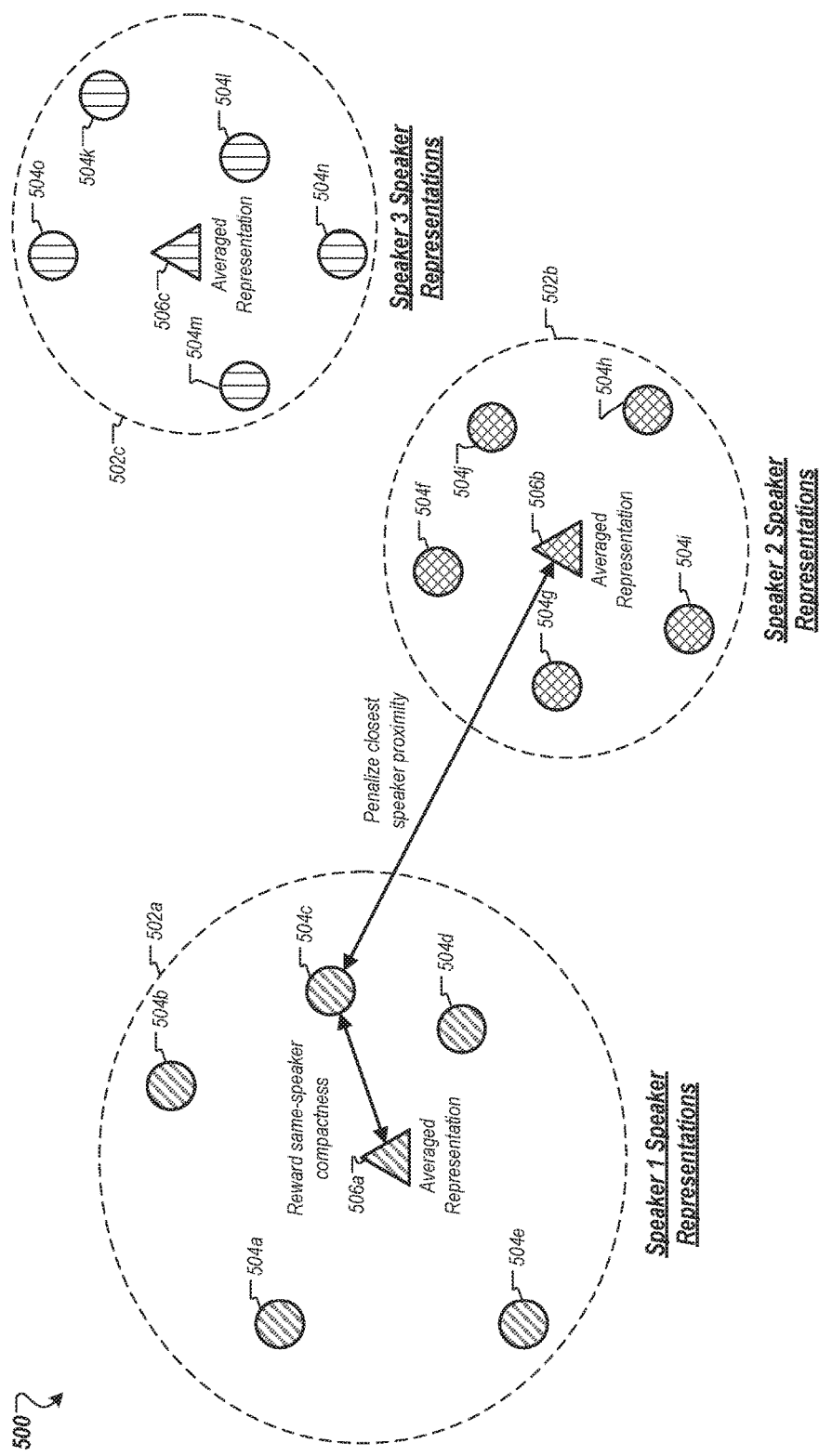
FIG. 5 is a conceptual plot of speaker representations for an example batch of training samples during a single training cycle of a speaker verification neural network.

FIG. 5 is a conceptual plot 500 of speaker representations for an example batch of training samples during a single training cycle of a speaker verification neural network. The plot 500 shows relative positions of speaker representations generated by the speaker verification neural network in Cartesian space. As shown, the batch includes three groups 502a-c of training samples for utterances of three different speakers, respectively. Because the speaking characteristics of each user are typically similar across multiple utterances in the batch, the primary speaker representations 504 for each user are clustered near each other. Moreover, averaged speaker representations 506a-c have been generated and plotted, e.g., at a center-of-gravity of the clusters 502a-c of each speaker. To illustrate how the training processes described herein, e.g., training process 300, determines a loss component for a given speaker representation 504c, arrows are drawn to indicate relative distances between (i) speaker representation 504c and matching averaged representation 506a and (ii) speaker representation 504c and the closest non-matching averaged speaker representation 506b. The loss function applied during training incentivizes compactness among speaker representations of the same speaker by penalizing longer distances to a matching averaged speaker representation, while also incentivizing increased separation between the speaker representation 504c and the closest non-matching averaged speaker representation 506 to increase their distance.

Figure 6:
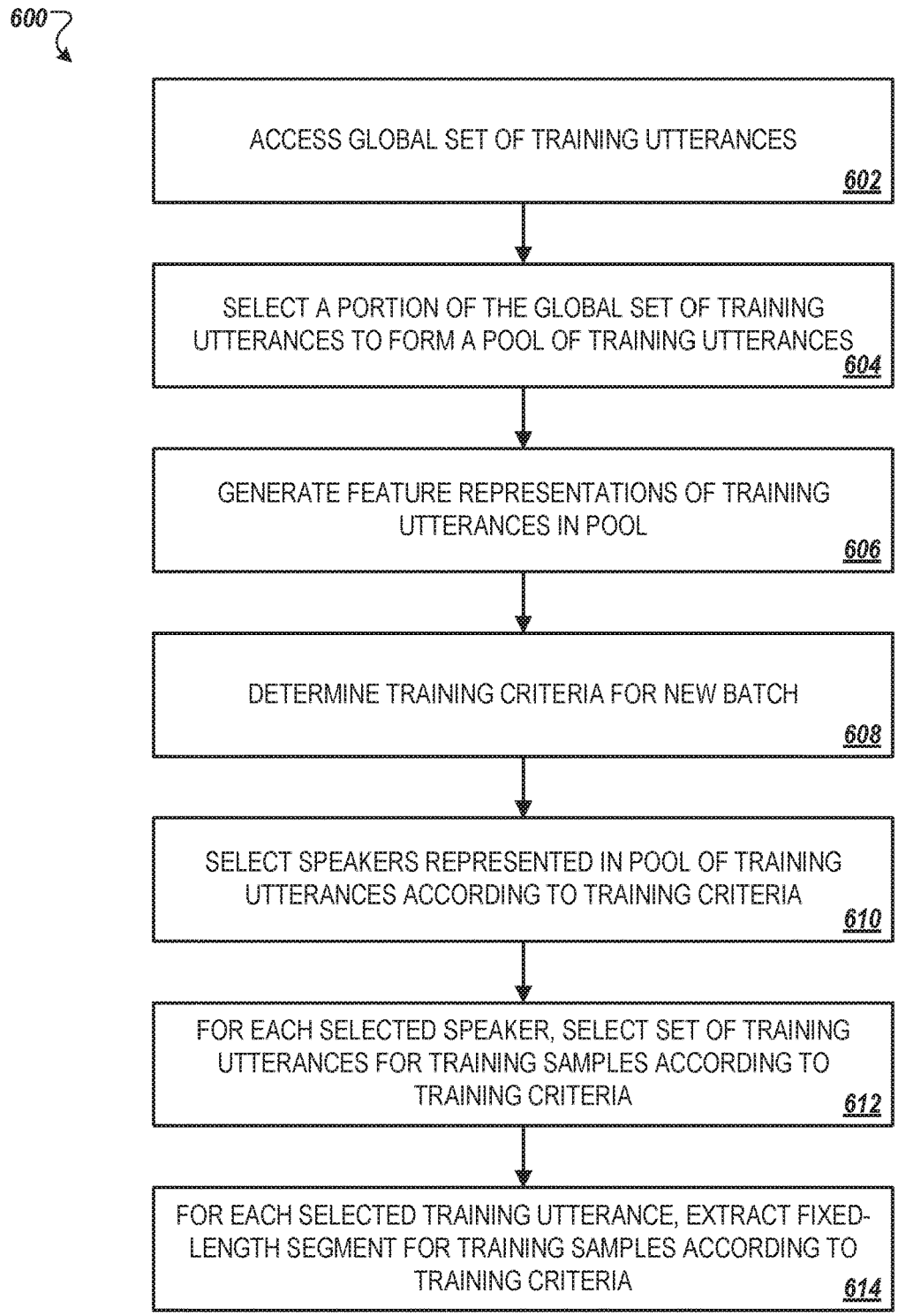
FIG. 6 is a flowchart of an example process for generating a batch of training samples from which to train a speaker verification neural network, e.g., speaker verification neural network, in a particular training cycle.

FIG. 6 is a flowchart of an example process 600 for generating a batch of training samples from which to train a speaker verification neural network, e.g., speaker verification neural network 140, in a particular training cycle. In order to implement training efficiencies and to train a potentially more robust, and more accurate speaker verification neural network, a training computing system may generate batches of training samples according to specified training criteria, and the training criteria may be adjusted across training cycles.

At stage 602, the training system accesses a global set of training utterances. The global set of training utterances may represent the entire library of training utterances available for training the speaker verification neural network at a particular time, for example. The training utterances may be stored in audio files that have not yet been converted to feature data for use as training samples in a training cycle. Moreover, different utterances in the global set may have different playback lengths. For instance, the utterances may have playback lengths in the range 0.5-10 seconds.

At stage 604, the system selects a portion of the global set of training utterances to form a pool of training utterances. In some implementations, the training system may use training samples derived from the same pool of training utterances for a series of multiple training cycles (e.g., which may be consecutive training cycles) until a condition is met to cause the training system to create a new pool of training utterances from which to generate batches of training samples for a next series of training cycles. The pool of training utterances may include training utterances from multiple speakers and, for each speaker, multiple training utterances. In some implementations, the speakers represented in a pool are specifically selected based on criteria such as familial relationship, geographic location, gender, or preliminarily determined speaker characteristics. For example, the system may select training utterances for speakers that are estimated to be similar to each other, so that the system can be trained to differentiate even among very similar speakers. In other implementations, the speakers represented in the pool are selected randomly.

At stage 606, the training system generates feature representations of the training utterances in the pool of training utterances. For example, a feature extractor may process each training utterance in the pool to generate a respective feature representation of the training utterance. The lengths of the feature representations may vary based on the initial length of the audio files for the training utterances.

At stage 608, the training system determines training criteria for a batch of training samples that is to be used in a particular training cycle. The training criteria can include, for example, a total number of speakers to be represented in the batch, a total number of training samples per speaker, a training sample length, or a combination of two or more of these. The training criteria can change for different training cycles. As an example, the training criteria of a batch for a first training cycle may specify a total of 8 speakers to be represented in the batch with 7 utterances of 1.5 seconds each for each speaker. Yet, the training criteria of a batch for a second training cycle may specify different values, e.g., a total of 15 speakers to be represented in the batch with 4 utterances of 0.5 seconds each for each speaker.

At stage 610, the training system selects a number of speakers represented in the current pool to be represented in a new batch according to the current training criteria for the batch. In some instances, fewer speakers are represented in a batch than are represented in the pool. The speakers may be selected randomly or algorithmically.

At stage 612, the training system selects, for each speaker in the batch, a number of the speaker's training utterances to include in the batch according to the current training criteria for the batch. In some instances, fewer training utterances per user are included in a batch than are included in the pool. The training utterances may be selected randomly or algorithmically.

At stage 614, the training system generates training samples for the batch based on the selected training utterances. In some implementations, the training sample for a given training utterance is created by extracting a fixed-length portion of the training utterance having a length specified by the current training criteria. In some implementations, the system extracts a portion of feature data corresponding to the fixed length specified by the current training criteria from the full feature representation for the utterance that was generated at stage 606. It some implementations, it is more efficient to generate the feature representation of a full utterance first, and then extract a portion of the full feature representation as the training sample, thereby allowing extraction of features for different portions of the utterance for training samples in different cycles without having to re-generate the feature representation for an utterance in every cycle. In some instances, the length of the utterance specified by the training criteria is less than the full length of an utterance in the pool. The portion of the utterance that is extracted for a training sample may then be selected randomly or algorithmically.

Figure 7:
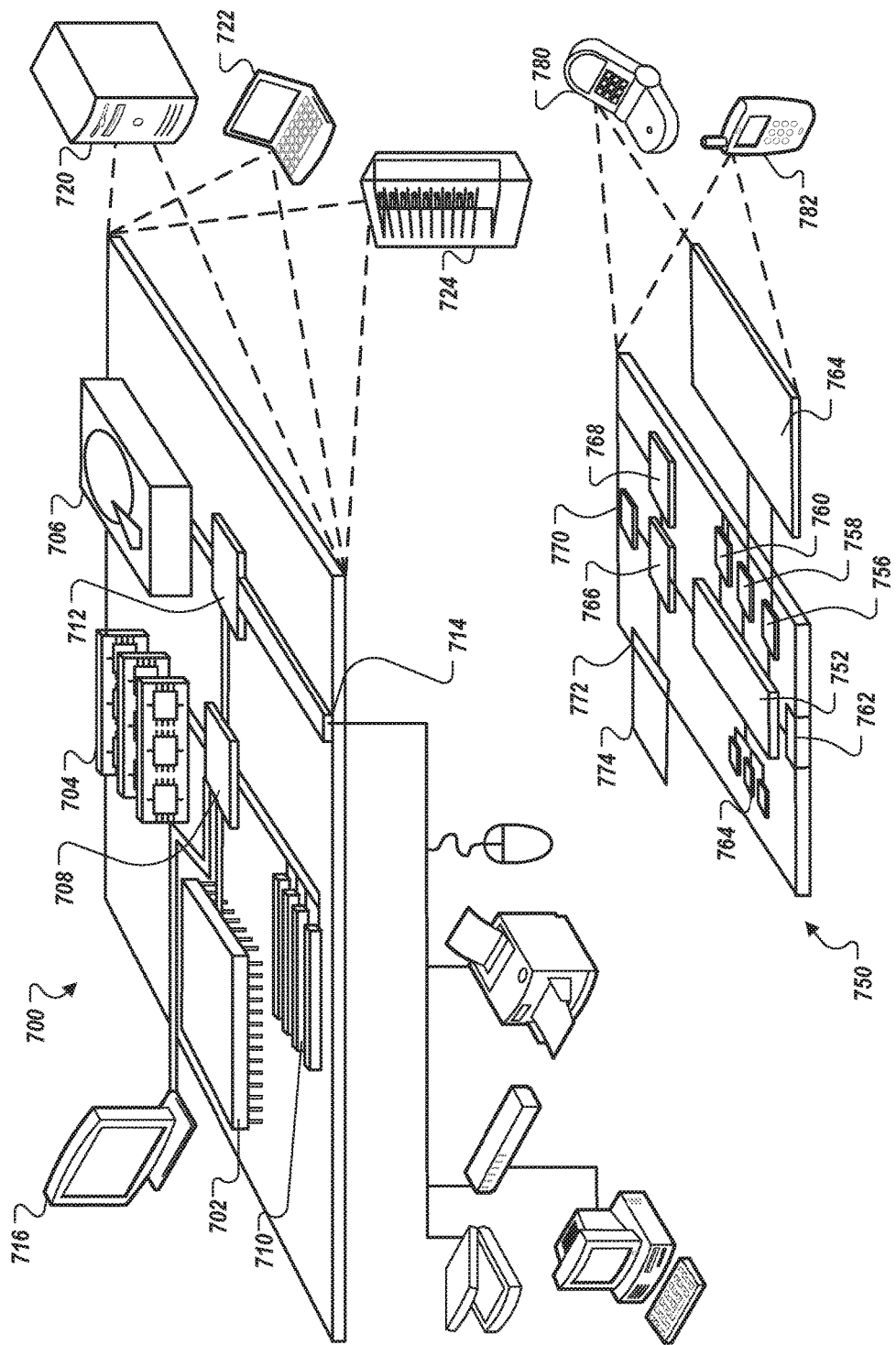
FIG. 7 shows an example of a computing device and a mobile computing device that can be used to implement the techniques described herein.

FIG. 7 shows an example of a computing device 700 and a mobile computing device that can be used to implement the techniques described herein. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
  receiving, by a computing device, data that characterizes a first utterance;
  providing, by the computing device, the data that characterizes the utterance to a speaker verification neural network, wherein the speaker verification neural network is trained on batches of training utterances using a respective training loss for each batch that is based on, for each of multiple training speakers represented in the batch:
(i) differences among speaker representations generated by the speaker verification neural network from training utterances of the training speaker within the batch, and
(ii) for each first speaker representation generated from a training utterance of the training speaker within the batch, a similarity between the first speaker representation and a second speaker representation for a particular different training speaker represented in the batch, the particular different training speaker selected from among the multiple training speakers represented in the batch based on a distance between the first speaker representation generated from the training utterance of the training speaker and the second speaker representation for the particular different training speaker, the second speaker representation determined based on multiple training utterances of the particular different training speaker;
obtaining, by the computing device, a speaker representation that indicates speaking characteristics of a speaker of the first utterance, wherein the speaker representation was generated by processing the data that characterizes the first utterance with the speaker verification neural network;
determining, by the computing device and based on the speaker representation, whether the first utterance is classified as an utterance of a registered user of the computing device; and
in response to determining that the first utterance is classified as an utterance of the registered user of the computing device, performing, by the computing device, an action for the registered user of the computing device.

2. The computer-implemented method of claim 1, wherein determining whether the first utterance is classified as an utterance of the registered user of the computing device comprises comparing the speaker representation for the first utterance to a speaker signature for the registered user, wherein the speaker signature is based on one or more speaker representations derived from one or more enrollment utterances of the registered user.

3. The computer-implemented method of claim 1, wherein the registered user is a first registered user;
the method comprising:
comparing the speaker representation for the first utterance to respective speaker signatures for multiple registered users of the computing device including the first registered user to determine a respective distance between the speaker representation for the first utterance and the respective speaker signatures for the multiple registered users; and
determining that the first utterance is classified as an utterance of the first registered user of the computing device based on the respective distance between the speaker representation for the first utterance and the respective speaker signature for the first registered user being less than a threshold distance from each other.

4. The computer-implemented method of claim 1, wherein:
the speaker verification neural network is stored locally on the computing device; and
obtaining the speaker representation comprises processing the data that characterizes a first utterance with the speaker verification neural network on the computing device.

5. The computer-implemented method of claim 1, wherein the second speaker representation is an averaged speaker representation generated by averaging speaker representations for the multiple training utterances of the particular different training speaker.

6. The computer-implemented method of claim 1, wherein for each training speaker of multiple training speakers represented in a batch, the differences among speaker representations generated by the speaker verification neural network from training utterances of the training speaker within the batch are determined based on distances of the speaker representations of the training speaker to an averaged speaker representation generated from two or more training utterances of the training speaker.

7. The computer-implemented method of claim 1, wherein the speaker verification neural network is a long short-term memory (LSTM) neural network.

8. The computer-implemented method of claim 1, wherein the data that characterizes the first utterance is feature data that characterizes acoustic features of the first utterance; and
the method further comprises generating the feature data for the first utterance from audio data for the first utterance that characterizes an audio waveform of the first utterance.

9. The computer-implemented method of claim 1, wherein performing the action that is assigned to the registered user of the computing device comprises transitioning the computing device from a locked state to an unlocked state.

10. The computer-implemented method of claim 1, wherein performing the action that is assigned to the registered user of the computing device comprises accessing user data from a user account of the registered user of the computing device.

11. A computer-implemented method for training a speaker verification neural network, comprising:
obtaining, by a computing system, a training batch that includes a plurality of groups of training samples, wherein:
(i) each training sample in the training batch characterizes a respective training utterance for the training sample, and
(ii) each of the plurality of groups of training samples corresponds to a different speaker such that each group consists of training samples that characterize training utterances of a same speaker that is different from the speakers of training utterances characterized by training samples in other ones of the plurality of groups of training samples;
for each training sample in the training batch, processing the training sample with the speaker verification neural network in accordance with current values of internal parameters of the speaker verification neural network to generate a speaker representation for the training sample that indicates speaker characteristics of a speaker of the respective training utterance characterized by the training sample;
for each group of training samples, averaging the speaker representations for training samples in the group to generate an averaged speaker representation for the group;

for each training sample in the training batch, determining a loss component for the speaker representation for the training sample based on:
(i) a distance between the speaker representation for the training sample and the averaged speaker representation for the group to which the training sample belongs, and
(ii) a distance between the speaker representation for the training sample and a closest averaged speaker representation among the averaged speaker representations for the groups to which the training sample does not belong; and
updating the current values of the internal parameters of the speaker verification neural network using the loss components for the speaker representations for at least some of the training samples in the training batch.

12. The computer-implemented method of claim 11, further comprising iteratively updating the current values of the internal parameters of the speaker verification neural network over a plurality of training iterations,
wherein the computing system trains the speaker verification neural network on different training batches in each of at least some of the plurality of training iterations.

13. The computer-implemented method of claim 11, further comprising generating the training batch by:
determining criteria for the training batch, the criteria specifying (i) a total number of speakers to be represented in the training batch and (ii) a total number of training samples per speaker to include in the training batch; and
selecting training samples for inclusion in the training batch according to the criteria.

14. The computer-implemented method of claim 13, wherein the criteria further include a specified length for training utterances characterized by training samples in the training batch; and
the method further comprises extracting segments of the specified length from random locations of the training utterances,
wherein each training sample in the training batch characterizes the segment of the respective training utterance for the training sample to an exclusion of a portion of the respective training utterance located outside of the segment that was extracted from the respective training utterance.

15. The computer-implemented method of claim 14, wherein the training batch is a first training batch that is used to train the speaker verification neural network in a first training iteration; and
the method further comprises:
determining second criteria for a second training batch that is for training the speaker verification neural network in a second training iteration, the second criteria specifying a second length for training utterances characterized by training samples in the second training batch, the second length being different from the length specified by the criteria for the first training batch; and
selecting training samples for inclusion in the second training batch according to the second criteria, wherein at least one training sample selected for inclusion in the second training batch characterizes a different segment of a same training utterance that is characterized by a training sample in the first training batch.

16. The computer-implemented method of claim 11, further comprising, for each training sample in the training batch:
determining a respective distance between the speaker representation for the training sample and a respective averaged speaker representation for each group to which the training sample does not belong; and
selecting the closest averaged speaker representation as the respective from the respective averaged speaker representations for the groups to which the training sample does not belong based on the respective distance between the speaker representation for the training sample and the closest averaged speaker representation being less than the respective distances between the speaker representation and the respective averaged speaker representation for each other group to which the training sample does not belong.

17. The computer-implemented method of claim 16, wherein determining the loss component for the speaker representation for each training sample in the training batch comprises determining the loss component according to a loss function that does not account for the respective distances between the speaker representation and the respective averaged speaker representation for each group to which the training sample does not belong other than the group that corresponds to the closest averaged speaker representation.

18. The computer-implemented method of claim 11, wherein updating the current values of the internal parameters of the speaker verification neural network comprises back-propagating a batch loss that is based on the loss components for the speaker representations for the at least some of the training samples using stochastic gradient descent.

19. The computer-implemented method of claim 11, wherein the speaker verification neural network is a long short-term memory (LSTM) neural network.

20. One or more non-transitory computer-readable media having instructions stored thereon that, when executed by one or more processors of a computing device, cause the one or more processors to perform operations comprising:
receiving, by the computing device, data that characterizes a first utterance;
providing, by the computing device, the data that characterizes the utterance to a speaker verification neural network, wherein the speaker verification neural network is trained on batches of training utterances using a respective training loss for each batch that is based on, for each of multiple training speakers represented in the batch:
(i) differences among speaker representations generated by the speaker verification neural network from training utterances of the training speaker within the batch, and
(ii) for each first speaker representation generated from a training utterance of the training speaker within the batch, a similarity between the first speaker representation and a second speaker representation for a particular different training speaker represented in the batch, the particular different training speaker selected from among the multiple training speakers represented in the batch based on a distance between the first speaker representation generated from the training utterance of the training speaker and the second speaker representation for the particular different training speaker, the second speaker representation determined based on multiple training utterances of the particular different training speaker;

obtaining, by the computing device, a speaker representation that indicates speaking characteristics of a speaker of the first utterance, wherein the speaker representation was generated by processing the data that characterizes the first utterance with the speaker verification neural network;

determining, by the computing device and based on the speaker representation, whether the first utterance is classified as an utterance of a registered user of the computing device; and in response to determining that the first utterance is classified as an utterance of the registered user of the computing device, performing an action for the registered user of the computing device.

* * * * *